(12) United States Patent
Xie

(10) Patent No.: US 8,212,997 B1
(45) Date of Patent: Jul. 3, 2012

(54) CHROMATIC CONFOCAL POINT SENSOR OPTICAL PEN WITH EXTENDED MEASURING RANGE

(75) Inventor: Yong Xie, Redmond, WA (US)

(73) Assignee: Mitutoyo Corporation, Kawasaki-shi (JP)

( * ) Notice: Subject to any disclaimer, the term of this patent is extended or adjusted under 35 U.S.C. 154(b) by 18 days.

(21) Appl. No.: 13/033,565

(22) Filed: Feb. 23, 2011

(51) Int. Cl.
*G01C 3/08* (2006.01)

(52) U.S. Cl. .......... 356/4.04; 356/3.15; 356/3; 356/445; 356/609

(58) Field of Classification Search .................. 356/445, 356/609, 3.15, 4.04, 3, 3.01, 4.01, 4.1
See application file for complete search history.

(56) References Cited

U.S. PATENT DOCUMENTS

| | | | |
|---|---|---|---|
| 3,807,836 | A | 4/1974 | Baker |
| 4,585,349 | A | 4/1986 | Gross |
| 4,854,680 | A | 8/1989 | Kikuchi |
| 5,386,312 | A | 1/1995 | Spencer |
| 5,785,651 | A * | 7/1998 | Kuhn et al. .................. 600/310 |
| 6,688,783 | B2 | 2/2004 | Janosik |
| 7,477,401 | B2 | 1/2009 | Marx |
| 7,561,273 | B2 * | 7/2009 | Stautmeister et al. ........ 356/445 |
| 7,626,705 | B2 | 12/2009 | Altendorf |
| 2004/0109170 | A1 | 6/2004 | Schick |
| 2006/0109483 | A1 | 5/2006 | Marx |
| 2010/0188742 | A1 * | 7/2010 | Chen et al. .................... 359/385 |
| 2010/0283989 | A1 | 11/2010 | Sesko |
| 2010/0284025 | A1 | 11/2010 | Sesko |

FOREIGN PATENT DOCUMENTS

| | | |
|---|---|---|
| WO | 96/41123 A1 | 12/1996 |
| WO | 02/08685 A2 | 1/2002 |
| WO | 2004/034244 A1 | 4/2004 |

OTHER PUBLICATIONS

Emtman, C.E., and Y. Xie, "Method for Operating a Dual Beam Chromatic Point Sensor System for Simultaneously Measuring Two Surface Regions," U.S. Appl. No. 12/946,747, filed Nov. 15, 2010.

(Continued)

*Primary Examiner* — Layla Lauchman
(74) *Attorney, Agent, or Firm* — Christensen O'Connor Johnson Kindness PLLC

(57) ABSTRACT

A chromatic confocal point sensor optical pen comprises a multi-stage optical configuration providing an enhanced range-to-resolution ratio. The optical configuration comprises at least first and last axially dispersive focusing elements that combine to contribute to the overall axial chromatic dispersion of the optical pen. The first focusing element receives source radiation and focuses that radiation at a first focal region internal to the multi-stage optical configuration and the last focusing element receives radiation from a last focal region internal to the multi-stage optical configuration and outputs the measurement beam. Intermediate focusing elements may provide additional focal regions internal to the multi-stage optical configuration. This configuration provides an unprecedented combination of extended sensing range, compact lens diameter, and high numerical aperture. The focusing elements may comprise refractive lenses or diffractive optical elements.

16 Claims, 4 Drawing Sheets

OTHER PUBLICATIONS

European Search Report dated Aug. 18, 2008, in Application No. 08102239.4, filed Mar. 4, 2008, 5 pages.

Geary, J.M., "Introduction to Lens Design," Willmann-Bell, 2002, p. 176.

Molesini, G., and F. Quercioli, "Pseudocolor Effects of Longitudinal Chromatic Aberration," Journal of Optics (Paris) 17(6):279-282, Nov. 1986.

"Optical Pens: Micrometric Measurement Range," Stil S.A., Aix—en—Provence, France, product brochure published on or before Mar. 6, 2007, 2 pages.

Smith, W.J., "Modern Optical Engineering," Third Edition, McGraw-Hill, 2000, p. 94.

Villatoro. J., et al., "Fabrication and Modeling of Uniform-Waist Single-Mode Tapered Optical Fiber Sensors," Applied Optics 42(13):2278-2283, May 1, 2003.

* cited by examiner

CHROMATIC CONFOCAL POINT SENSOR OPTICAL PEN WITH EXTENDED MEASURING RANGE

FIELD OF THE INVENTION

The invention relates generally to precision measurement instruments, and more particularly to a chromatic point sensor system comprising a multi-stage optical configuration which provides an extended measuring range.

BACKGROUND OF THE INVENTION

Controlled chromatic aberration techniques may be utilized for distance sensing metrology applications. As described in "Pseudocolor Effects of Longitudinal Chromatic Aberration," G. Molesini and S. Quercioli, *J. Optics* (Paris), 1986, 17(6):279-282, controlled longitudinal chromatic aberration (also referred to herein as axial chromatic dispersion) may be introduced in an optical imaging system, causing the imaging system focal length to vary with wavelength, which provides means for optical metrology. In particular, a lens can be designed whose back focal length (BFL) is a monotonic function of wavelength. In white light operation such a lens exhibits a rainbow of axially dispersed foci that can be used as a spectral probe for distance sensing applications.

As a further example, U.S. Pat. No. 7,477,401, which is hereby incorporated herein by reference in its entirety, discloses that an optical element having axial chromatic aberration, also referred to as axial or longitudinal chromatic dispersion, may be used to focus a broadband light source such that the axial distance to the focus varies with the wavelength. Thus, only one wavelength will be precisely focused on a surface, and the axial distance or height of the surface determines which wavelength is best focused. Upon reflection from the surface, the light is refocused onto a small detector aperture, such as a pinhole and/or the end of an optical fiber. Upon reflection from a surface, only the wavelength that is well-focused on the surface is well-focused on the pinhole and/or fiber. All of the other wavelengths are poorly focused on the fiber, and so will not couple much power into the fiber. Therefore, the signal level will be greatest for the wavelength corresponding to the height of the object. A spectrometer at the detector measures the signal level for each wavelength, which effectively indicates the height of the object.

Certain manufacturers refer to a practical and compact optical assembly that is suitable for chromatic confocal ranging in an industrial setting as a chromatic confocal point sensor and/or as an "optical pen." One example of optical pen instruments that measure Z height are those manufactured by STIL, S. A. of Aix-en-Provence, France (STIL S. A.). As a specific example, the STIL optical pen model number OP 300NL measures Z heights and has a 300 micron range.

Another configuration for a chromatic confocal point sensor and optical pen is described in commonly assigned U.S. Pat. No. 7,626,705 (the '705 patent) which is hereby incorporated herein by reference in its entirety. The '705 patent discloses a lens configuration providing an improved optical throughput and an improved spot size which results in improved measurement resolution in comparison with various commercially available configurations.

One figure of merit for an optical pen is its range-to-resolution ratio, for example a versatile optical pen should be able to measure over a long range with high resolution. Generally speaking, in known optical pens, a relatively large numerical aperture is necessary for high resolution measurements, and to extend the measuring range for a given numerical aperture, a larger pen diameter is required. However, it is desirable to have a compact design for a chromatic confocal point sensor optical pen in various applications. Thus, an optical pen having an improved range-to-resolution ratio in a compact size would be desirable.

SUMMARY OF THE INVENTION

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The present invention is directed to providing an optical pen which provides an extended measuring range while using a compact output lens diameter and a high numerical aperture for optical components of the optical pen. In various embodiments, a chromatic confocal point sensor optical pen operable to provide a signal usable to measure a distance to a surface comprises: a housing; an aperture that outputs source radiation and receives reflected radiation; and a multi-stage optical configuration arranged along an optical axis of the chromatic confocal point sensor optical pen to receive the source radiation from the aperture, output it toward the surface as a focused measurement beam having axial chromatic dispersion, receive reflected radiation from the surface and focus the reflected radiation proximate to the aperture with axial chromatic dispersion. The multi-stage optical configuration comprises a plurality of axially dispersive focusing elements. The plurality of axially dispersive focusing elements comprise: a first axially dispersive focusing element that receives source radiation and focuses that radiation at a first focal region internal to the multi-stage optical configuration, and a last axially dispersive focusing element that receives radiation from a last focal region internal to the multi-stage optical configuration and outputs the measurement beam. At least the first and last axially dispersive focusing elements provide respective amounts of axial chromatic dispersion which contribute to increase the overall axial chromatic dispersion of the measurement beam.

In some embodiments, the first focal region and the last focal region may span a shared dimension along the optical axis. Such embodiments may comprise two axially dispersive focusing elements. In other embodiments, the plurality of axially dispersive focusing elements may further comprise at least one intermediate axially dispersive focusing element which receives radiation from an adjacent focal region internal to the multi-stage optical configuration and focuses that radiation at a respective intermediate focal region internal to the multi-stage optical configuration. Such embodiments may comprise at least three axially dispersive focusing elements. In some embodiments, one respective intermediate focal region and the last focal region may span a shared dimension along the optical axis.

In some embodiments, each of the axially dispersive focusing elements may comprise at least one optical component which is identical in each of the axially dispersive focusing elements. In some embodiments, each of the axially dispersive focusing elements may be identical.

In some embodiments, each axially dispersive focusing element may comprise a single optical component.

In some embodiments, at least one of the axially dispersive focusing elements may comprise at least one diffractive optical element. In some embodiments, each of the axially dispersive focusing elements may comprise at least one diffractive optical element.

In some embodiments, each of the axially dispersive focusing elements may comprise an Abbe number which is less than 65.

In some embodiments, the axially dispersive focusing elements may comprise a refractive lens with a refractive index which is greater than 1.5.

In some embodiments, the chromatic confocal point sensor pen may comprise an output aperture which is at most 5 mm. In some such embodiments, each axially dispersive focusing element may consist of lenses having a diameter which is at most 5 mm.

In some embodiments, the focused measurement beam may comprise a range of numerical apertures for constituent wavelengths of the measurement beam and the range may include a numerical aperture greater than 0.15. In some such embodiments, a measuring range of at least 500 μm may be provided. In some such embodiments, the combination of numerical aperture range and measuring range may be provided by multi-stage optical configuration having a diameter which is the most 5 mm.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENTS

Figure 1:
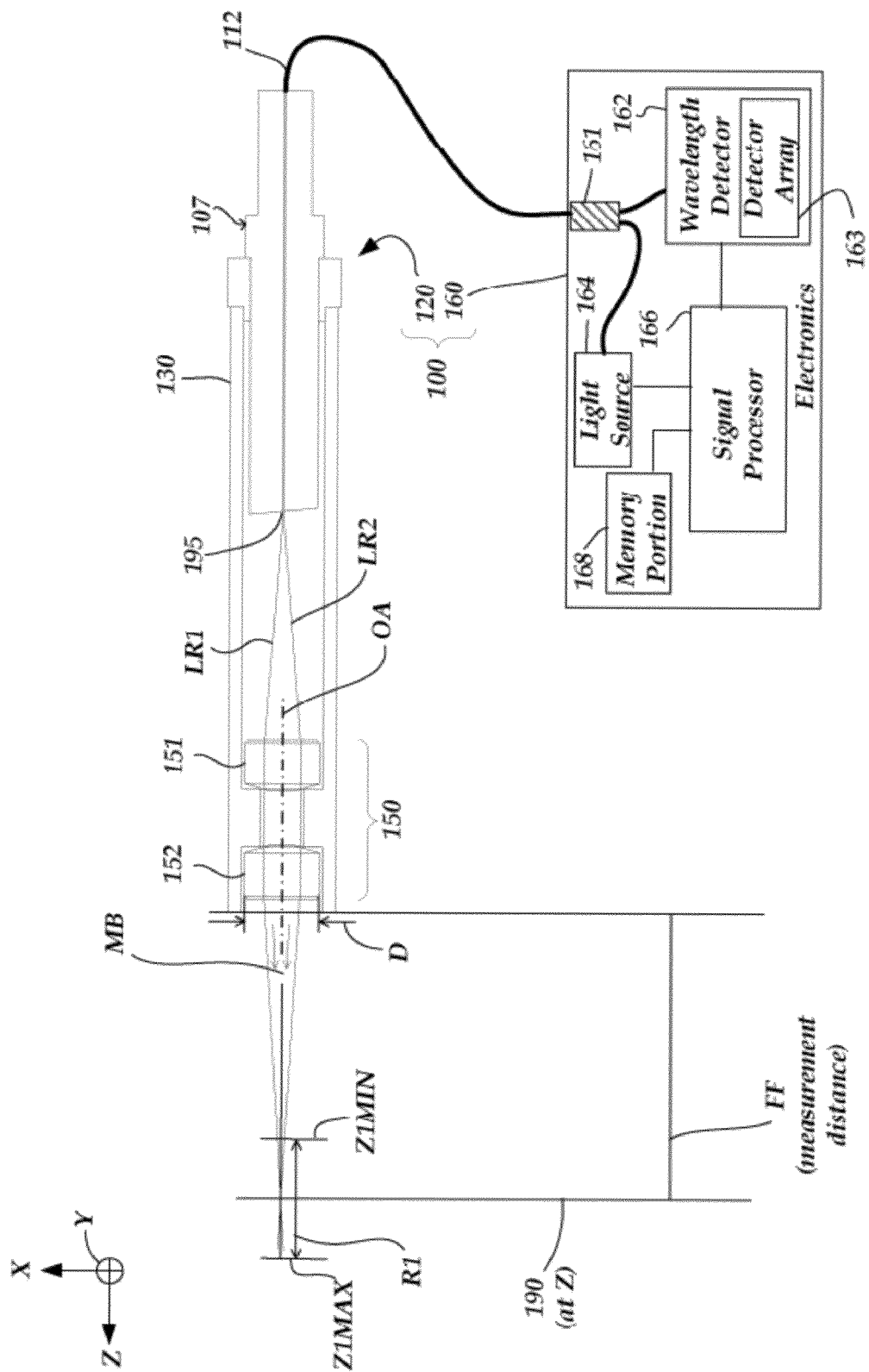
FIG. 1 is a block diagram of an exemplary prior art chromatic confocal point sensor which comprises a single-stage optical configuration in an optical pen.

FIG. 1 is a block diagram of an exemplary chromatic confocal point sensor 100 comprising a single-stage optical configuration in an optical pen 120. The chromatic confocal point sensor 100 has certain similarities to sensors described in copending U.S. patent application Ser. No. 11/940,214, U.S. patent application Ser. No. 12/463,936 and U.S. patent application Ser. No. 12/946,747 (the '214, '936, and '947 Applications, respectively) which are hereby incorporated herein by reference in their entirety. As shown in FIG. 1, the chromatic confocal point sensor 100 includes an optical pen 120 and an electronics portion 160. The optical pen 120 includes a fiber optic connector 107, a housing 130, and an axially dispersive optical element 150. The optical configuration is characterized as "single-stage" because it comprises only the single axially dispersive optical element 150, wherein there is no focal plane or focal region internal to the axially dispersive optical element 150. That is, in contrast to the embodiments described with reference to FIGS. 2-4, the only focal planes or focal regions in the optical pen 120 of FIG. 1 are located in the measuring range R1 and proximate to the fiber aperture 195.

In the embodiment shown in FIG. 1, the axially dispersive optical element 150 comprises a first lens 151 and a second lens 152. The fiber optic connector 107 is attached to the end of the housing 130. The fiber optic connector 107 receives an in/out optical fiber (not shown in detail) through a fiber optic cable 112 which encases it. The in/out optical fiber outputs source radiation through a fiber aperture 195, and receives reflected measurement signal radiation through the fiber aperture 195. The axially dispersive optical element 150 is arranged along an optical axis OA of the optical pen 120 to receive the source radiation from the fiber aperture 195, output it toward a workpiece surface 190 as a focused measurement beam MB having axial chromatic dispersion and receive reflected radiation from the workpiece surface 190 and focus the reflected radiation proximate to the fiber aperture 195 with axial chromatic dispersion.

In operation, broadband (e.g., white) source radiation emitted from the fiber end through the fiber aperture 195 is focused by the axially dispersive optical element 150, which includes optical elements that provide an axial chromatic dispersion, such that the focal point along the optical axis OA is at different distances depending on the wavelength of the radiation, as is known for chromatic confocal sensor systems. The source radiation includes a wavelength that is focused on the workpiece surface 190 at a position 'Z relative to the optical pen 120. Upon reflection from the workpiece surface 190, reflected radiation is refocused by the axially dispersive optical element 150 onto the fiber aperture 195. The operative source radiation and reflected radiation are bounded by the limiting rays LR1 and LR2. Due to the axial chromatic dispersion, only one wavelength will have a front focus dimension FF that matches the measurement distance from the optical pen 120 to the workpiece surface 190. The optical pen 120 is configured such that the wavelength that is best focused at the workpiece surface 190 will also be the wavelength of the reflected radiation that is best focused at the fiber aperture 195. The fiber aperture 195 spatially filters the reflected radiation such that predominantly the best focused wavelength passes through the fiber aperture 195 and into the core of the optical fiber cable 112. As described in more detail below and in the incorporated references, the optical fiber cable 112 routes the reflected signal radiation to a wavelength detector 162 that is utilized for determining the wavelength having the dominant intensity, which corresponds to the measurement distance to the workpiece surface 190. The optical pen 120 has a measuring range R1 that is bounded by a minimum range distance Z1MIN and a maximum range distance Z1MAX.

The electronics portion 160 includes a fiber coupler 161, the wavelength detector 162, a light source 164, a signal processor 166 and a memory portion 168. In various embodiments, the wavelength detector 162 includes a spectrometer or spectrograph arrangement wherein a dispersive element (e.g., a grating) receives the reflected radiation through the optical fiber cable 112 and transmits the resulting spectral intensity profile to a detector array 163. The wavelength detector 162 may also include related signal processing (e.g., provided by the signal processor 166, in some embodiments) that removes or compensates certain detector-related error components from the profile data. Thus, certain aspects of the wavelength detector 162 and the signal processor 166 may be merged and/or indistinguishable in some embodiments.

The white light source 164, which is controlled by the signal processor 166, is coupled through the optical coupler 161 (e.g., a 2×1 optical coupler) to the fiber cable 112. As described above, the radiation travels through the optical pen 120 which produces longitudinal chromatic aberration so that its focal length changes with the wavelength of the radiation. The wavelength of radiation that is most efficiently transmitted back through the fiber is the wavelength that is in focus on the workpiece surface 190 at the position Z. The reflected wavelength-dependent radiation intensity then passes through the fiber coupler 161 again so that approximately 50% of the radiation is directed to the wavelength detector 162, which may receive a spectral intensity profile distributed over an array of pixels along a measurement axis of the detector array 163, and operate to provide corresponding profile data. Briefly, a subpixel-resolution distance-indicating coordinate of the profile data (e.g., a peak position coordinate) is calculated by the signal processor 166, and the distance-indicating coordinate corresponding to the wavelength peak determines the measurement distance to the surface via a distance calibration lookup table which is stored in the memory portion 168. The distance-indicating coordinate may be determined by various methods such as determining the centroid of profile data included in a peak region of the profile data.

It should be appreciated that the axially dispersive optical element 150 shown in FIG. 1 is a particularly simple example. In practice, known optical pens which provide high range-to-resolution ratios generally comprise axially dispersive optical elements which include complex compound lenses and the like. Alternatively, some known optical pens provide relatively high range-to-resolution ratios by using diffractive optical elements (DOEs). However, such known single-stage optical configurations have been pushed approximately to their practical design limits. Although measuring ranges and/or range-to-resolution ratios can be extended by increasing the lens (or DOE) diameters, this results in a large optical pen diameter which is not practical in many applications.

Figure 2:
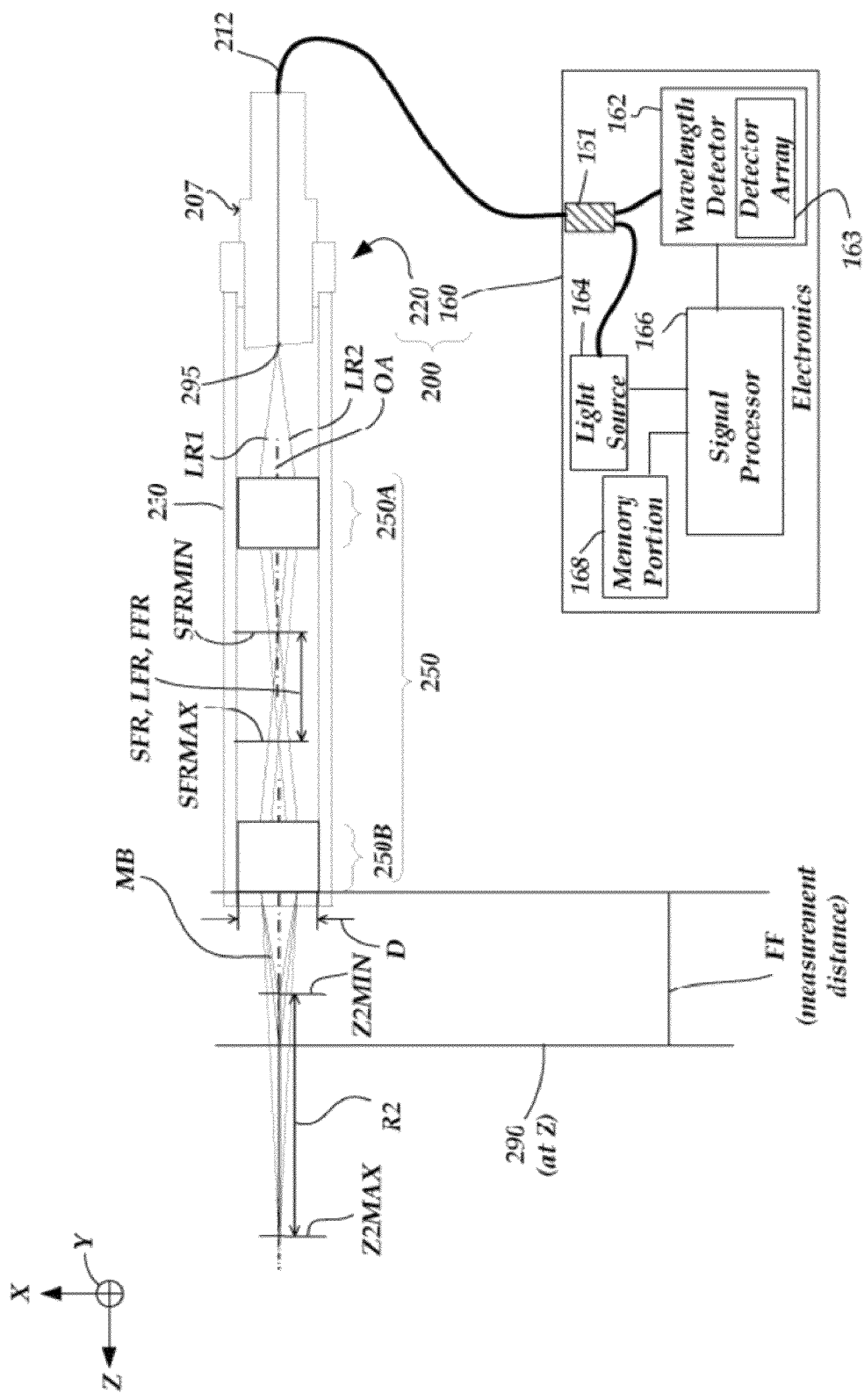
FIG. 2 is a block diagram of a chromatic confocal point sensor which illustrates a schematically represented first exemplary multi-stage optical configuration in an optical pen.

FIG. 2 is a block diagram of a chromatic confocal point sensor 200 which illustrates a schematically represented first exemplary multi-stage optical configuration 250 in an optical pen. Except for the use of the multi-stage optical configuration 250, the design and operation of the chromatic confocal point sensor 200 may be understood based on the previous description of the chromatic confocal point sensor 100 of FIG. 1. Elements numbered 2XX may be similar or identical to similar elements 1XX of FIG. 1 (e.g., those having matching "XX" suffixes). Thus, only the distinctive features of the multi-stage optical configuration 250 are described in detail below.

The multi-stage optical configuration 250 may be used in place of the single-stage optical configuration 150 previously described with reference to FIG. 1, in order to provide a combination of range-to-resolution and compact diameter which is unprecedented. In the embodiment shown in FIG. 2, the multi-stage optical configuration 250 comprises a first axially dispersive focusing element 250A and a second (or last) axially dispersive focusing element 250B which have focal regions that overlap at a shared dimension along the optical axis. In this case, the second axially dispersive focusing element 250B is also the last axially dispersive focusing element, because it is the axially dispersive focusing element which outputs the measurement beam MB. In one embodiment, each of the axially dispersive focusing elements 250A and 250B may comprise the axially dispersive optical element 150 previously described with reference to FIG. 1, or the like. More generally, various axially dispersive focusing elements usable as the elements 250A and 250B, may include more complex lens sets, or DOEs, or both, as described in greater detail below.

In operation, the first axially dispersive focusing element 250A receives source radiation from the fiber aperture 295 and focuses that radiation at a first focal region FFR internal to the multi-stage optical configuration 250, which in this case is also a last focal region LFR internal to the multi-stage optical configuration 250, because there are only two axially dispersive focusing elements. The last axially dispersive focusing element 250B receives radiation from the last focal region LFR internal to the multi-stage optical configuration 250 and outputs the measurement beam MB. It should be appreciated that in the embodiment shown in FIG. 2, the first focal region FFR of the first axially dispersive focusing element 250A and the last focal region LFR of the last axially dispersive focusing element 250B span a shared dimension along the optical axis OA bound by the planes SFRMAX and SFRMIN, which define a shared focal region SFR. Operable wavelengths of the optical pen are focused in the shared focal region. The first axially dispersive focusing element 250A and the last axially dispersive focusing element 250B provide respective amounts of axial chromatic dispersion which contribute to increase the overall axial chromatic dispersion of the measurement beam MB. The optical pen 220 provides a measuring range R2 (bounded by a minimum range distance Z2MIN and a maximum range distance Z2MAX) which exceeds a measuring range that could be provided by a single-stage optical configuration in an optical pen having a similar diameter (e.g., the measuring range R1 in FIG. 1).

Figure 4:
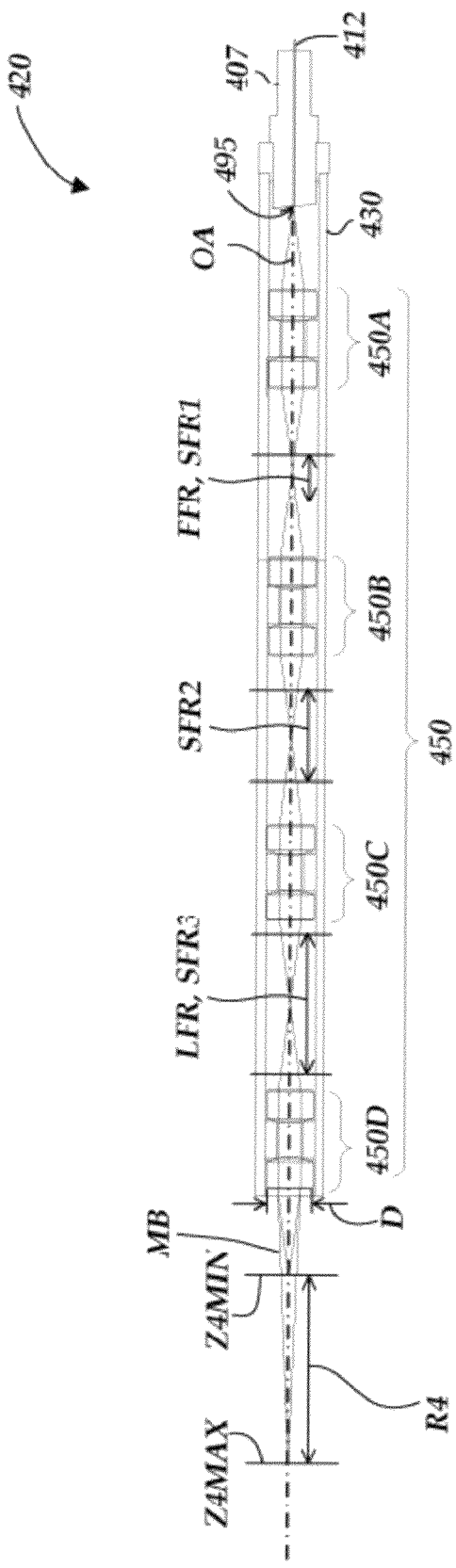
FIG. 4 is a diagram which illustrates a third exemplary multi-stage optical configuration in an optical pen.

In general, a chromatic confocal point sensor may be constructed in an analogous manner with more than two axially dispersive focusing elements, with a shared focal region between each pair of axially dispersive focusing elements, for example, as shown in FIG. 4. For a chromatic confocal point sensor optical pen which comprises N axially dispersive focusing elements with respective axial dispersion ranges Ri, if the axially dispersive focusing elements are combined in an optical pen in a manner analogous to that outlined above for the multi-stage optical configuration 250 which comprises focusing elements with a lateral magnification of −1, the total measuring range R (that is, the total axial chromatic dispersion of the measurement beam) of such a chromatic confocal point sensor optical pen may be approximately the sum of those respective axial dispersion ranges Ri:

$$R \approx \sum_{i=1}^{N} R_i \qquad \text{(Eq. 1)}$$

In a more general case, for a chromatic confocal point sensor which comprises a multi-stage optical configuration which uses source light with a numerical aperture of $NA_{back}$, and focusing elements with various magnification levels which image either a shared focal region or a workpiece surface with numerical apertures $NA_i$, the total measuring range R is given by:

$$R \approx \sum_{i=1}^{N} R_i (NA_i / NA_{back})^2 \qquad \text{(Eq. 2)}$$

Figure 3:
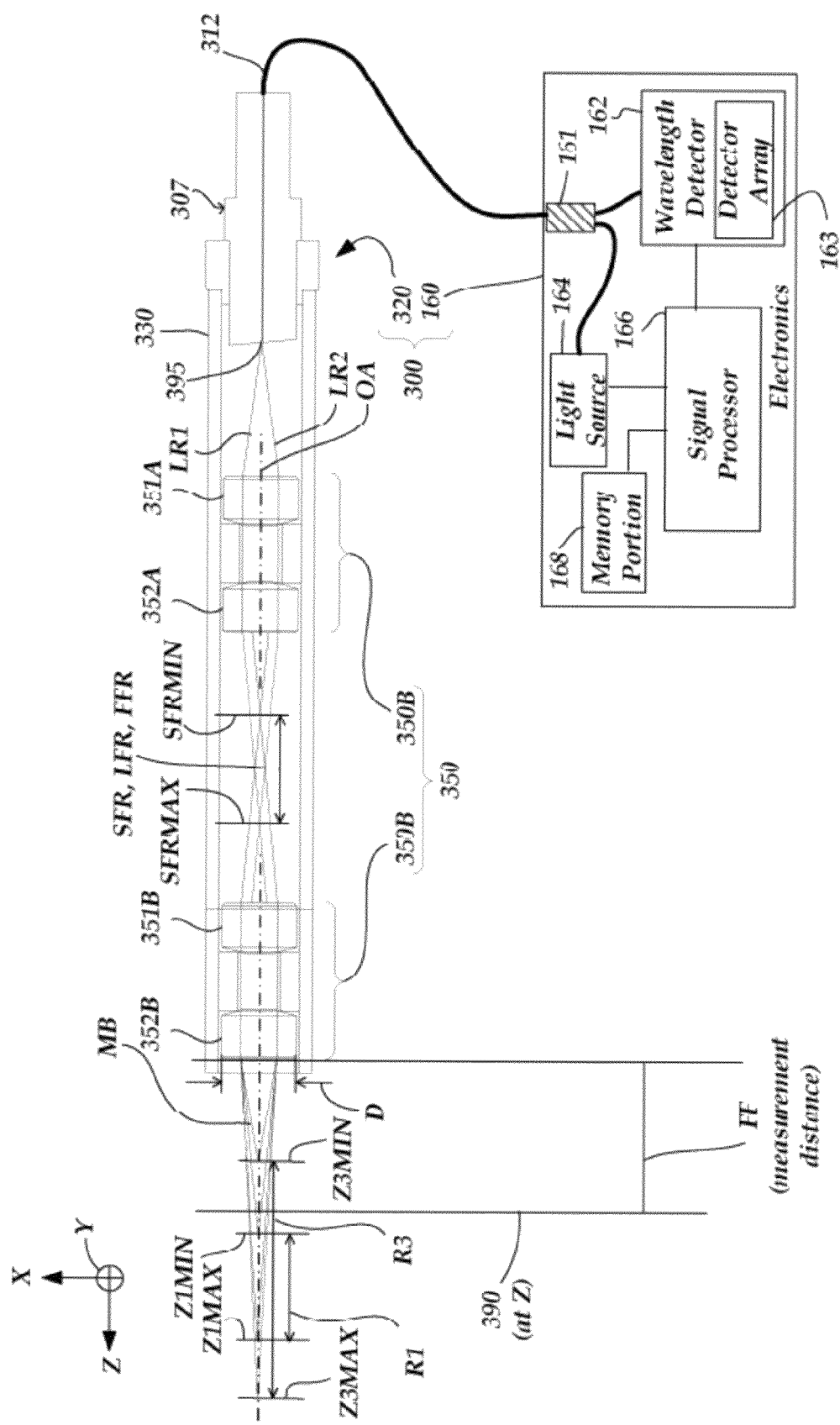
FIG. 3 is a block diagram of a chromatic confocal point sensor which illustrates a second exemplary multi-stage optical configuration in an optical pen.

For simplicity, the embodiments shown in FIG. 3 and FIG. 4 follow the parameters of Equation 1.

Using the foregoing principle, in various embodiments, the optical pen 220 may be configured to provide a measuring range R2 which is at least 500 microns, using lenses having a compact diameter (e.g., 5 mm or less). However, these particular values are exemplary only, and not limiting.

The chromatic confocal point sensor 200 is particularly advantageous, in that it includes a compact output aperture diameter D and an extended measuring range R2 with a high range-to-resolution ratio (e.g., in comparison to the chromatic confocal point sensor 100). In some embodiments, the chromatic confocal point sensor 200 may provide a measurement beam MB that focuses some of the wavelengths of radiation in the measurement beam with a corresponding numerical aperture of at least 0.15, or more. In some embodiments, it may focus some of the wavelengths of radiation in the measurement beam with a numerical aperture as high as 0.35. In some embodiments, the optical pen comprises an output aperture diameter D which is less than 5 mm.

In various embodiments, the first axially dispersive focusing element 250A and the last axially dispersive focusing element 250B used in the chromatic confocal point sensor 200 may be used in analogous configurations, e.g., such as those shown in FIG. 3 and FIG. 4. In various embodiments, each axially dispersive focusing element may comprise one or several optical components (e.g., such as one of the configurations disclosed in the '214, '936, and '747 applications and the '705 patent). In some embodiments, each of the axially dispersive focusing elements comprises at least one optical component which is identical in each of the axially dispersive focusing elements. In some embodiments, each of the axially dispersive focusing elements is identical in their entirety. The multi-stage optical configuration 250 or analogous configurations may comprise refractive lenses, but it should be appreciated that such configurations are not limited to refractive lenses. In some embodiments, at least one of the axially dispersive focusing elements comprises at least one diffractive optical element (DOE). In some embodiments, each of the axially dispersive focusing elements comprises a diffractive optical element. In embodiments which comprise refractive lenses, axially dispersive focusing elements with a higher refractive index generally have lower levels of spherical aberration and therefore, a higher refractive index will allow for more reliable position measurements to be performed by a chromatic confocal point sensor pen. Thus, in some embodiments, at least one of axially dispersive focusing elements comprises a refractive lens with a refractive index which is greater than 1.5.

In general, it is desirable for a multi-stage optical configuration to comprise axially dispersive focusing elements with a lower Abbe number, which allows for a chromatic confocal point sensor pen to comprise fewer focusing elements to achieve a desired measuring range since each focusing element contributes a higher degree of axial chromatic dispersion. Thus, in some embodiments, it is desirable that each of the axially dispersive focusing elements provides an Abbe number which is 65 or less. In some embodiments, it is even more desirable that each of the axially dispersive focusing elements provides an Abbe number as low as 20 or less. Axially dispersive focusing elements which provide such Abbe numbers may be identified by one skilled in the art, based on known methods of analysis and/or experiment.

FIG. 3 is a block diagram of a chromatic confocal point sensor 300 which illustrates a second exemplary multi-stage optical configuration 350 in an optical pen, which may be one particular implementation of the multi-stage optical configuration 250 previously described with reference to FIG. 2. The design and operation of the chromatic confocal point sensor 300 may be generally understood based on the previous description of the chromatic confocal point sensor 200 of FIG. 2. Elements numbered 3XX may be similar or identical to similar elements 2XX of FIG. 2 (e.g., those having matching "XX" suffixes). Thus, only the distinctive features associated with use of the multi-stage optical configuration 350 are described in detail below.

The multi-stage optical configuration 350 comprises a first axially dispersive focusing element 350A and a second (or last) axially dispersive focusing element 350B which have focal regions that overlap at a shared dimension along the optical axis, in the shared focal region SFR internal to the multi-stage optical configuration 350. In this case, the second axially dispersive focusing element 350B is also the last axially dispersive focusing element, because it is the axially dispersive focusing element which outputs the measurement beam MB. In one particular embodiment, each of the axially dispersive focusing elements 350A and 350B may comprise the axially dispersive optical element 150, previously described with reference to FIG. 1, or the like. It is a strength of the multi-stage optical configuration 350 that it may achieve a high range-to-resolution ratio in a compact diameter, while using relatively simple optical elements. In some embodiments, the elements 350A and 350B may be identical. In some embodiments, the lenses 351A and 352A that make up the element 350A (and/or the lenses 351B and 352B that make up the element 350B) may be identical. However, more generally, either of the axially dispersive focusing elements 350A and 350B may comprise any of the types of axially dispersive optical elements previously described with reference to FIG. 1 or FIG. 2, or the like.

As shown in FIG. 3, the optical pen 320 provides a measuring range R3, bounded by a minimum range distance Z3MIN and a maximum range distance Z3MAX, which exceeds a measuring range that could be provided by a single-stage optical configuration in an optical pen having a similar diameter (e.g., the measuring range R1 in FIG. 1). Because the axial dispersion of the multi-stage optical configuration 350 is cumulative (e.g., as indicated by EQUATION 1), when the first axially dispersive focusing element 350A and the second or last axially dispersive focusing element 350B are each similar to the axially dispersive focusing element 150 of FIG. 1, according to EQUATION 1, the range measuring R3 is approximately equal to 2*R1. In one practical embodiment of the chromatic confocal point sensor 100 of FIG. 1, the measuring range R1 may be approximately 270 microns, whereas the chromatic confocal point sensor 300 of FIG. 3 may have a measuring range R3 of approximately 540 microns with high resolution, and a housing diameter that is no larger than that of the chromatic confocal point sensor 100.

FIG. 4 is a diagram which illustrates a third exemplary a multi-stage optical configuration 450 in an optical pen 420. The optical pen 420 comprises elements which are similar to that of the optical pen 320 of FIG. 3. It should be appreciated that similarly numbered elements 4XX are similar or identical to elements 3XX of FIG. 3 and only those elements which are different are outlined with respect to FIG. 4. The design and operation of the multi-stage optical configuration 450 in the optical pen 420 may be generally understood based on the previous description of the multi-stage optical configurations 250 of FIGS. 2 and 350 of FIG. 3. Elements numbered 3XX may be analogous or identical to similar elements 2XX of FIG. 2 (e.g., those having matching "XX" suffixes). Thus, only the distinctive features associated with use of the multi-stage optical configuration 450 are described in detail below.

In comparison to the multi-stage optical configurations 250 and/or 350, the multi-stage optical configuration 450 comprises four axially dispersive focusing elements, including a first axially dispersive focusing element 450A, a second axially dispersive focusing element 450B, a third axially dispersive focusing element 450C and a fourth or last axially dispersive focusing element 450D. In this case, the fourth axially dispersive focusing element 450D is also the last axially dispersive focusing element, because it is the axially dispersive focusing element which outputs the measurement beam MB. The second and third axially dispersive focusing elements 450B and 450C, respectively, may be described as intermediate elements located between the first and last axially dispersive focusing elements, internally to the multi-stage optical configuration 450.

The first axially dispersive focusing element 450A and the second axially dispersive focusing element 450B have respective focal regions that overlap at a shared dimension along the optical axis, in a first shared focal region SFR1. The second axially dispersive focusing element 450B and the third axially dispersive focusing element 450C have respective focal regions that overlap at a shared dimension along the optical axis, in a second shared focal region SFR2, and the third axially dispersive focusing element 450C and the fourth or last axially dispersive focusing element 450D have respective focal regions that overlap at a shared dimension along the optical axis, in a third or last shared focal region SFR3.

In one embodiment, each of the axially dispersive focusing elements 450A and 450B may comprise the axially dispersive optical element 150 previously described with reference to FIG. 1, or the like. It is a strength of the multi-stage optical configuration 450 that it may achieve a high range-to-resolution ratio in a compact diameter, while using relatively simple optical elements. In some embodiments, the elements 450A and 450B may be identical. In some embodiments, the lenses 451A and 452A that make up the element 450A (and/or the lenses 451B and 452B that make up the element 450B) may be identical. However, more generally, any of the axially dispersive focusing elements 450A-450D may comprise any of the types of axially dispersive optical elements previously described with reference to FIG. 1 or FIG. 2, or the like.

Because the multi-stage optical configuration 450 comprises four axially dispersive focusing elements, according to the principle of EQUATION 1, this allows for an even greater measuring range than the multi-stage optical configuration 350, which comprises two axially dispersive focusing elements. In operation, the first axially dispersive focusing element 450A receives source radiation from the fiber aperture 495 and focuses that radiation at the first shared focal region SFR1 internal to the multi-stage optical configuration 450. The second axially dispersive focusing element 450B receives radiation from the adjacent first shared focal region SFR1, and focuses that radiation at the adjacent second shared focal region SFR2 internal to the multi-stage optical configuration 450. The third axially dispersive focusing element 450C receives radiation from the adjacent second shared focal region SFR2 internal to the multi-stage optical configuration 450 and focuses that radiation at the adjacent third shared focal region SFR3 internal to the multi-stage optical configuration 450, which is also the last shared focal region LFR. The fourth or last axially dispersive focusing element 450D receives radiation from the last focal region LFR internal to the multi-stage optical configuration 450 and outputs the measurement beam MB. The second and third shared focal regions SFR2 and SFR3 may be described as intermediate focal regions located between the first and last axially dispersive focusing elements, internally to the multi-stage optical configuration 450.

As shown in FIG. 4, the optical pen 420 provides a measuring range R4, bounded by a minimum range distance Z4MIN and a maximum range distance Z4MAX, which exceeds a measuring range that could be provided by a single-stage optical configuration in an optical pen having a similar diameter (e.g., the measuring range R1 in FIG. 1). Because the axial dispersion of the multi-stage optical configuration 450 is cumulative (e.g., as indicated by EQUATION 1), if the axially dispersive focusing elements 450A, 450B, 450C, and 450D are each similar to the axially dispersive focusing element 150, according to EQUATION 1, the range R4 is approximately equal to 4*R1. In one practical embodiment of the chromatic confocal point sensor 100 of FIG. 1, the measuring range R1 may be approximately 270 microns, whereas a chromatic confocal point sensor using the optical pen 420 of FIG. 4 may have a measuring range R4 of approximately 1.1 mm with high resolution, and a housing diameter that is no larger than that of the chromatic confocal point sensor 100.

It will be appreciated, based on the foregoing teachings, that a multi-stage optical configuration as disclosed herein need not be limited to two or four axially dispersive focusing elements, but may comprise any desired plurality of axially dispersive focusing elements. While the preferred embodiment of the invention has been illustrated and described, numerous variations in the illustrated and described arrangements of features and sequences of operations will be apparent to one skilled in the art based on this disclosure. Thus, it will be appreciated that various changes can be made therein without departing from the spirit and scope of the invention.

The embodiments of the invention in which an exclusive property or privilege is claimed are defined as follows:

1. A chromatic confocal point sensor optical pen operable to provide a signal usable to measure a distance to a surface, the chromatic confocal point sensor optical pen comprising:
   a housing;
   an aperture that outputs source radiation and receives reflected radiation; and
   a multi-stage optical configuration arranged along an optical axis of the chromatic confocal point sensor optical pen to receive the source radiation from the aperture, output it toward the surface as a focused measurement beam having axial chromatic dispersion, receive reflected radiation from the surface and focus the reflected radiation proximate to the aperture with axial chromatic dispersion,
   wherein:
      the multi-stage optical configuration comprises a plurality of axially dispersive focusing elements comprising:
         a first axially dispersive focusing element that receives source radiation and focuses that radiation at a first focal region internal to the multi-stage optical configuration, and
         a last axially dispersive focusing element that receives radiation from a last focal region internal to the multi-stage optical configuration and outputs the measurement beam; and
      at least the first and last axially dispersive focusing elements provide respective amounts of axial chromatic dispersion which contribute to increase the overall axial chromatic dispersion of the measurement beam.

2. The chromatic confocal point sensor optical pen of claim 1, wherein the first focal region and the last focal region span a shared dimension along the optical axis.

3. The chromatic confocal point sensor optical pen of claim 1, wherein the plurality of axially dispersive focusing elements further comprises at least one intermediate axially dispersive focusing element which receives radiation from an adjacent focal region internal to the multi-stage optical configuration and focuses that radiation at a respective adjacent intermediate focal region internal to the multi-stage optical configuration.

4. The chromatic confocal point sensor optical pen of claim 3, wherein one respective adjacent intermediate focal region and the last focal region span a shared dimension along the optical axis.

5. The chromatic confocal point sensor optical pen of claim 1, wherein each of the axially dispersive focusing elements comprises at least one optical component which is identical in each of the axially dispersive focusing elements.

6. The chromatic confocal point sensor optical pen of claim 1, wherein each of the axially dispersive focusing elements is identical.

7. The chromatic confocal point sensor optical pen of claim 1, wherein each axially dispersive focusing element comprises a single optical component.

8. The chromatic confocal point sensor optical pen of claim 1, wherein at least one of the axially dispersive focusing elements comprises at least one diffractive optical element.

9. The chromatic confocal point sensor optical pen of claim 8, wherein each of the axially dispersive focusing elements comprises at least one diffractive optical element.

10. The chromatic confocal point sensor optical pen of claim 1, wherein each of the axially dispersive focusing elements comprises an Abbe number which is less than 65.

11. The chromatic confocal point sensor optical pen of claim 1, wherein the axially dispersive focusing elements comprise a refractive lens with a refractive index which is greater than 1.5.

12. The chromatic confocal point sensor optical pen of claim 1, wherein the focused measurement beam comprises a range of numerical apertures for constituent wavelengths of the measurement beam and the range includes a numerical aperture greater than 0.15.

13. The chromatic confocal point sensor optical pen of claim 12, wherein the chromatic confocal point sensor pen comprises an output aperture which is at most 5 mm.

14. The chromatic confocal point sensor optical pen of claim 1, wherein the chromatic confocal point sensor pen comprises an output aperture which is at most 5 mm.

15. The chromatic confocal point sensor optical pen of claim 14, wherein the chromatic confocal point sensor pen comprises a measuring range which is at least 500 um.

16. The chromatic confocal point sensor optical pen of claim 1, wherein the chromatic confocal point sensor pen comprises a measuring range which is at least 500 um.

* * * * *